No. 785,699. PATENTED MAR. 21, 1905.
T. BEMIS.
ADJUSTABLE FENCE FOR SAWS.
APPLICATION FILED SEPT. 23, 1904.
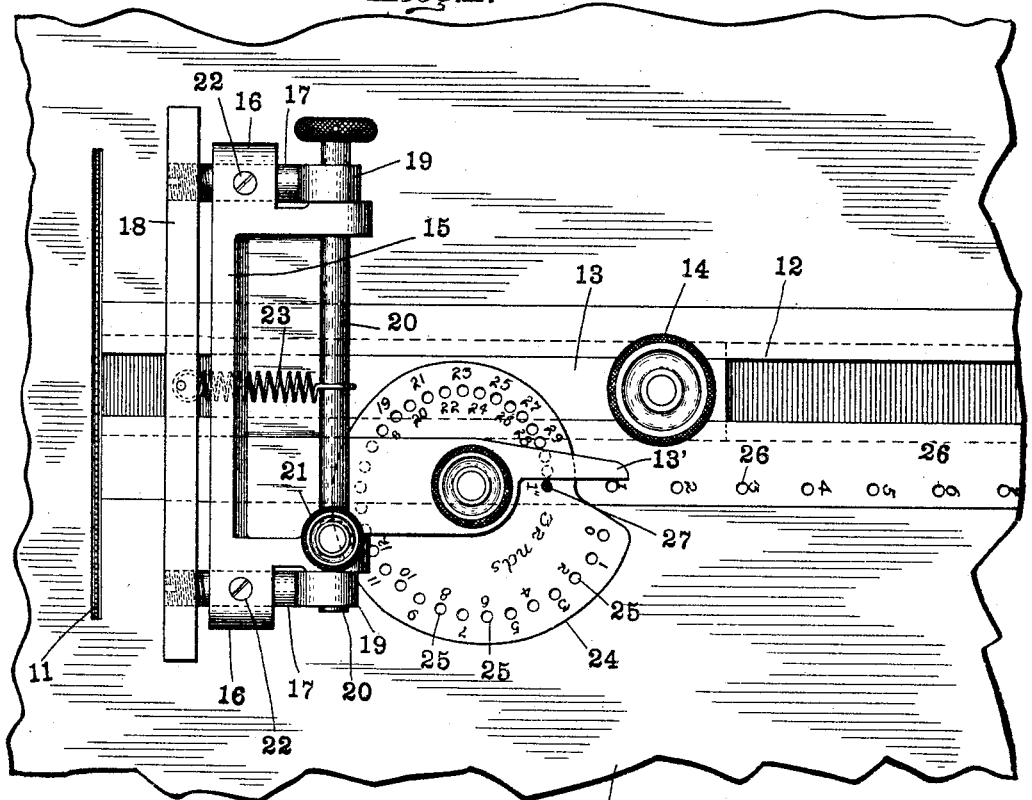
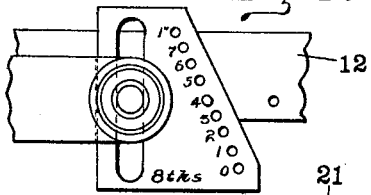
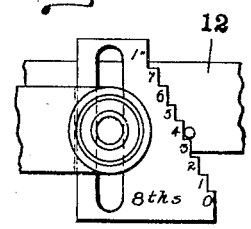
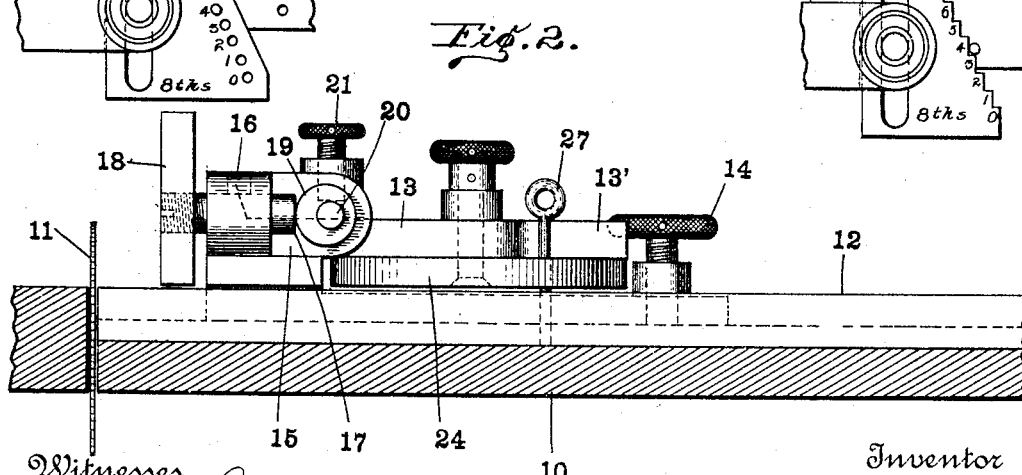
Witnesses
Frank A. Fahle
J. A. Walsh
Inventor
Thomas Bemis
By
Bradford & Hood
Attorneys No. 785,699. Patented March 21, 1905.

UNITED STATES PATENT OFFICE.

THOMAS BEMIS, OF INDIANAPOLIS, INDIANA.

ADJUSTABLE FENCE FOR SAWS.

SPECIFICATION forming part of Letters Patent No. 785,699, dated March 21, 1905.

Application filed September 23, 1904. Serial No. 225,652.

*To all whom it may concern:*

Be it known that I, THOMAS BEMIS, a citizen of the United States, residing at Indianapolis, in the county of Marion and State of Indiana, have invented certain new and useful Improvements in Adjustable Fences for Saws, of which the following is a specification.

The object of my invention is to provide means by which the adjustable fence or guide of a saw-table may be easily and quickly accurately adjusted.

The accompanying drawings illustrate my invention.

Figure 1 is a plan of the mechanism embodying my said invention; Fig. 2, an elevation thereof, the saw-table proper being shown in section; and Figs. 3 and 4 details of modification.

In the drawings, 10 indicates the saw-table, and 11 the saw, of any desired form. Set in or formed in table 10 is a track or way 12, extending at right angles from the saw. Slidably mounted in the track or way 12 is the fence-carriage 13, which may be clamped in any desired position of adjustment by a suitable hand-wheel 14. The fence-carriage 13 is provided with a transverse head 15, which lies substantially parallel with the saw, and this head is provided at opposite ends with pin-bearings 16 16, which lie at right angles to the saw and are adapted to receive pins 17 17, which project therethrough. The saw ends of pins 17 are threaded, as shown, into the gate 18, the arrangement being such that the gate 18 may be adjusted so as to lie perfectly parallel with the saw. The opposite ends of pins 17 rest upon cams 19 19, which cams are carried by shaft 20, rotatably mounted in the head 15 of the fence-carriage 13. Shaft 20 may be held in any desired position of angular adjustment by means of a suitable clamping-screw 21, and, if desired, the pins 17 may be clamped in any desired adjustment by means of clamping-screws 22 22. I find it convenient to provide a spring 23, one end of which is attached to the fence 18 at about its middle and the other end of which is attached to the shaft 20 or to any other desired part of the carriage 13, the arrangement being such that the spring tends to normally hold the ends of pins 17 against their cams 19.

Rotatably mounted on the carriage 13 in a plane parallel with the table 10 is an adjusting-plate 24, which has formed therethrough a plurality of pin-holes 25, arranged at different distances from the axis of rotation of said plate, in the present drawings said holes approaching the center at the rate of one thirty-second of an inch, the first hole being marked "0" and the last hole being marked "One inch," this last-mentioned hole being in a full-sized machine one inch nearer the axis of plate 24 than is the pin-hole "0." Formed in the table 10 adjacent and parallel with guide 12 or, as shown, in the guide-strip which is set into the table is a series of pin-holes 26, which are spaced a distance apart equal to the radial distance between the first and last holes 25. Carriage 13 is provided with a guide-finger 13', one edge of which lies substantially tangent to the series of holes 26, and a pin 27 is provided to pass through any pair of holes 25 and 26.

The operation is as follows: Plate 24 is rotated and the carriage 13 is shifted in guide 12 until pin-hole "0" of the series of 25 registers with the "0" hole of the series 26 and the pin 27 is inserted, thus holding the fence-carriage in position on the table. Thereupon shaft 20 is rotated until cams 19 cause pins 17 to bring the outer face of the fence 18 against the saw 11, this adjustment allowing for any slight inaccuracies in the relative position of the series of holes 26 and also permitting an adjustment of the fence 18 to accommodate saws having slight differences in set. If one-inch strips are desired it is merely necessary for the operator to withdraw the pin 27 from the series of holes 26 and shift the carriage 13 until said pin will drop in the No. 1 hole of the series 26. If strips three and twenty-three thirty-seconds inches wide are desired, the operator will rotate plate 24 and shift carriage 13 until the No. 23 hole of series 25 registers with the No. 3 hole of series 26. This shifting can be accomplished very rapidly, and the adjustment will of course be always accurate. It will be understood that a number of mechanical equivalents will occur to any mechanic for the plate 24. For instance, a plate having a notched edge, which plate is movable on the carriage 13 at right angles to the guide 12, might be used, or a similar plate having staggered perforations might be used, without departing from my invention.

I claim as my invention—

1. The combination, with a fence-carriage, of a fence, a pair of pins threaded into said fence and slidably mounted in suitable bearings in the fence-carriage parallel with the line of movement thereof, a shaft, a pair of cams carried by said shaft and engaging said pins, and means for holding the fence in desired positions of adjustment.

2. The combination, with a saw-table, of a fence-carriage movable along said table at an angle to the saw, two sets of position-finding means one set carried by the table and extending away from the saw and the other set carried by the carriage and independently movable with relation thereto, whereby any part of the position-finding set carried by the carriage may be brought into registry with any part of the position-finding set carried by the table, each change of registry of the position-finding means involving a change of position of the carriage, and means for holding the fence-carriage in any desired position of adjustment on the table.

3. The combination, with a saw-table, of a fence-carriage movable along said table at an angle to the saw, two sets of position-finding means one set carried by the table and extending away from the saw and the other set carried by the carriage and independently movable with relation thereto, whereby any part of the position-finding set carried by the carriage may be brought into registry with any part of the position-finding set carried by the table, each change of registry of the position-finding means involving a change of position of the carriage, means for holding the fence-carriage in any desired position of adjustment on the table, and independent means for adjusting the fence with relation to its carriage.

4. The combination, with a saw-table having a suitable guide extending away from the saw and a set of pin-holes arranged parallel with the guide, of a fence-carriage mounted in said guide, a fence carried thereby, a gage-plate rotatably mounted upon said fence-carriage and provided with a plurality of pin-holes varying in distance from the center of said plate, and a pin adapted to pass through any hole of the gage-plate and into any hole in the table.

5. The combination, with a saw-table having a suitable guide extending away from the saw and a set of pin-holes arranged parallel with the guide, of a fence-carriage mounted in said guide, a fence carried thereby, a gage-plate movably mounted upon said fence-carriage and provided with a plurality of pin-holes varying in effective distance from the fence, and a pin adapted to pass through any hole of the gage-plate and into any hole in the table.

6. The combination, with a saw-table having a suitable guide extending away from the saw and a set of pin-holes arranged parallel with the guide, of a fence-carriage mounted in said guide, a gage-plate rotatably mounted upon said fence-carriage and provided with a plurality of pin-holes varying in distance from the center of said plate, a pin adapted to pass through any hole of the gage-plate and into any hole in the table, a pair of pins mounted in said fence-carriage and movable parallel with the line of movement thereof, a fence carried by said pins, a shaft journaled on the fence-carriage, and a pair of cams carried by said shaft and engaging said fence-pins, substantially as and for the purpose set forth.

7. The combination, with a saw-table having a suitable guide extending away from the saw and a set of pin-holes arranged parallel with the guide, of a fence-carriage mounted in said guide, a gage-plate movably mounted upon said fence-carriage and provided with a plurality of pin-holes varying in effective distance from the fence, a pin adapted to pass through any hole of the gage-plate and into any hole in the table, a pair of pins mounted in said fence-carriage and movable parallel with the line of movement thereof, a fence carried by said pins, a shaft journaled on the fence-carriage, and a pair of cams carried by said shaft and engaging said fence-pins, substantially as and for the purpose set forth.

8. The combination, with a movable fence-carriage, of a pair of pins carried by said carriage and having threaded outer ends, a fence carried by said pins and having threaded engagement therewith, and means for adjusting said pins and the attached fence simultaneously with relation to the fence-carriage, for the purpose set forth.

In witness whereof I have hereunto set my hand and seal, at Indianapolis, Indiana, this 20th day of September, A. D. 1904.

THOMAS BEMIS. [L. S.]

Witnesses:
JAMES A. WALSH,
ARTHUR M. HOOD.